United States Patent
Farshchian et al.

(10) Patent No.: US 9,277,418 B1
(45) Date of Patent: Mar. 1, 2016

(54) METHODS, DEVICES AND SYSTEMS FOR SEPARATING OVERLAPPINGLY TRANSMITTED SIGNALS AND ENABLING JOINT SPECTRUM ACCESS

(71) Applicant: RadComm, Inc., Boston, MA (US)

(72) Inventors: Masoud Farshchian, Boston, MA (US); Rouzbeh Yassini-Fard, Boston, MA (US)

(73) Assignee: RadComm, Inc., Boston, MA (US)

( * ) Notice: Subject to any disclaimer, the term of this patent is extended or adjusted under 35 U.S.C. 154(b) by 0 days.

(21) Appl. No.: 14/804,499

(22) Filed: Jul. 21, 2015

(51) Int. Cl.
*H04W 16/14* (2009.01)
*G01S 7/02* (2006.01)
*H04W 88/08* (2009.01)

(52) U.S. Cl.
CPC .............. *H04W 16/14* (2013.01); *G01S 7/023* (2013.01); *H04W 88/08* (2013.01)

(58) Field of Classification Search
CPC ....... H04W 16/14; H04W 88/08; G01S 7/023
See application file for complete search history.

(56) References Cited

U.S. PATENT DOCUMENTS

| | | | |
|---|---|---|---|
| 7,606,193 B2 | 10/2009 | McFarland et al. | |
| 7,623,060 B1 | 11/2009 | Chhabra et al. | |
| 8,818,284 B2 | 8/2014 | Hochstedler et al. | |
| 2005/0059364 A1* | 3/2005 | Hansen et al. | 455/127.4 |
| 2006/0097909 A1* | 5/2006 | Blunt et al. | 342/159 |
| 2006/0258296 A1* | 11/2006 | Steer et al. | 455/67.13 |
| 2013/0236115 A1* | 9/2013 | Nguyen et al. | 382/260 |
| 2014/0192656 A1 | 7/2014 | Chandramouli et al. | |
| 2014/0313910 A1* | 10/2014 | Appleton | 370/252 |

OTHER PUBLICATIONS

Pedersen, Michael S., et al. "A survey of convolutive blind source separation methods." *Multichannel Speech Processing Handbook* (2007): 1065-1084.

Holdren, J. P., and E. Lander. *Realizing the full potential of government-held spectrum to spur economic growth.* Technical Report, 2012.

Griffiths, Hugh, Simon Watts, and Mike Wicks. "Radar Spectrum Engineering and Management: Technical and Regulatory Issues." *Proceedings of the Institute of Electrical and Electronics Engineers (IEEE)* (2014).

Makino, Shoji, Te-Won Lee, and Hiroshi Sawada, eds. *Blind speech separation.* Berlin: Springer, 2007. CHP1.

Deng, Hai, and Braham Himed. "Interference mitigation processing for spectrum-sharing between radar and wireless communications systems." *Aerospace and Electronic Systems, IEEE Transactions on* 49.3 (2013): 1911-1919.

(Continued)

*Primary Examiner* — Leon Flores
(74) *Attorney, Agent, or Firm* — Harness, Dickey & Pierce

(57) ABSTRACT

In one example embodiment, a device includes a memory configured to store computer-readable instructions therein and a processor. The processor is configured to execute the computer-readable instructions to receive a mixture signal, and determine a first signal and a second signal from the mixture signal, the first signal being a signal of a first technology and the second signal being a signal of a second technology, the first and second signals being overlappingly transmitted signals, at least one of the first signal and the second signal being used for processing of information associated with the at least one of the first signal and the second signal.

23 Claims, 8 Drawing Sheets

(56) References Cited

OTHER PUBLICATIONS

Geng, Zhe, Hai Deng, and Braham Himed. "Adaptive Radar Beamforming for Interference Mitigation in Radar-Wireless Spectrum Sharing." *Signal Processing Letters, IEEE* 22.4 (2015): 484-488.

Goldstein, Tom, et al. "Fast alternating direction optimization methods." *SIAM Journal on Imaging Sciences* 7.3 (2014): 1588-1623.

Boyd, Stephen, et al. "Distributed optimization and statistical learning via the alternating direction method of multipliers." *Foundations and Trends® in Machine Learning* 3.1 (2011): 1-122.

Picciolo, Michael, Jacob D. Griesbach, and Karl Gerlach. "Adaptive LFM waveform diversity." *Radar Conference, 2008. RADAR'08. IEEE*. IEEE, 2008.

Richards, Mark A. *Fundamentals of radar signal processing.* Tata McGraw-Hill Education, 2005. CHP3.

Elad, Michael, et al. "Simultaneous cartoon and texture image inpainting using morphological component analysis (MCA)." *Applied and Computational Harmonic Analysis* 19.3 (2005): 340-358.

Khawar, Awais, Ahmed Abdel-Hadi, and T. Charles Clancy. "Spectrum sharing between S-band radar and LTE cellular system: A spatial approach." *Dynamic Spectrum Access Networks (DYSPAN), 2014 IEEE International Symposium on*. IEEE, 2014.

\* cited by examiner

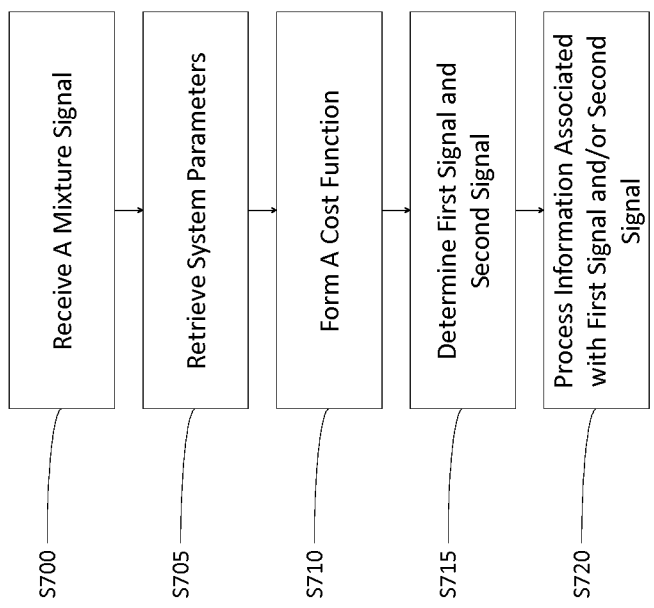

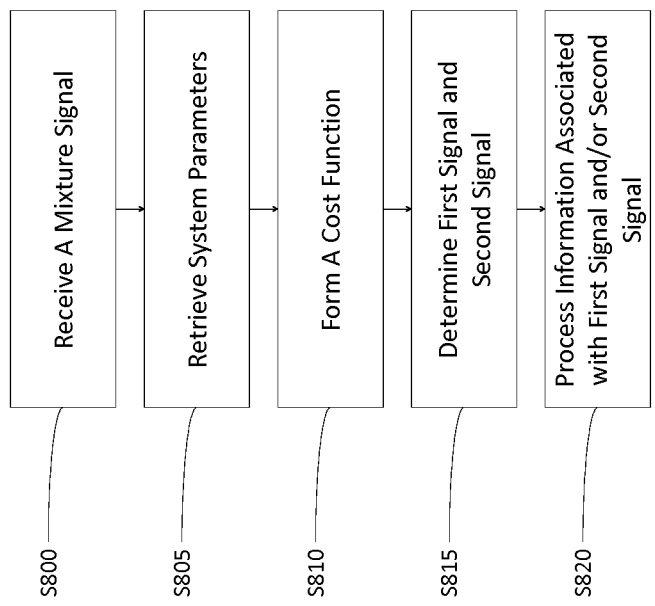

METHODS, DEVICES AND SYSTEMS FOR SEPARATING OVERLAPPINGLY TRANSMITTED SIGNALS AND ENABLING JOINT SPECTRUM ACCESS

BACKGROUND

The radio-frequency (RF) electromagnetic spectrum, extending from below 1 MHz to above 100 GHz, represents a finite resource that is shared by variety of devices including devices operating using wireless communications standards, radar devices, television broadcasts, radio navigation and other RF devices. The increasing demand by consumers for higher data rates induces competition among RF devices for accessing the finite RF spectrum. Accordingly, appropriate federal agencies have recently recommended that 1000 MHz of federally-controlled RF spectrum should be freed or shared with the private industry in order to meet the ever growing need for wireless communications-based services.

A signal mixture represents a super-position of a plurality of individual signals with the addition of possible noise. Examples of signal mixtures occur in many applications. For example, when a plurality of RF devices such as radars and wireless communications devices are simultaneously operating over the same frequency spectrum, the received baseband signal at each individual device is a signal mixture that is a superposition of the signals from each RF device. If such signal is used as an input or source into receivers at radars or wireless communication devices, the performance of the radars and wireless communications will degrade relative to their actual performance potential when no super-position by external signals is present.

A special case of separation of mixtures which is more challenging are convolutive mixtures which may arise in several signal processing fields such as speech processing, music processing, sonar processing, radio communications processing, antenna array data processing, astronomical data processing, satellite imagery processing, functional brain image processing, etc. For example, in acoustic processing, such mixtures arise due to time delays resulting from sound propagation over space and the multipath induced from reflections of sound by different objects.

Radars are used for a variety of applications including air-traffic-control, weather forecasting, automotive collision avoidance systems, ground penetrating radars for finding underground resources, altimeters for elevation measurements, geophysical monitoring of resources by synthetic aperture radar (SAR) systems, etc. Studies have shown that the effect of wireless communications interference on radar systems may severely inhibit the performance of radar devices/systems. Therefore, conventionally, when a primary device (e.g., a radar device) operates in a given spectrum (e.g., frequency band), secondary devices such as devices communicating using wireless communications technologies, have not been allowed to operate in the given spectrum.

Various solutions have been proposed for enabling the use of "white spectrum" (e.g., RF spectrum used by primary devices) by the secondary devices. This means allowing secondary wireless devices to operate when the primary wireless device(s) are not active within a frequency band and geographical area. One such proposed solution is referred to as Dynamic Spectrum Access (DSA), with Dynamic Frequency Selection (DFS) being a particular example of the DSA solution.

Another proposed solution (not currently implemented or not implemented for spectrum sharing purposes) might be radar systems such as passive systems and multiple-input multiple-output (MIMO) radars to alleviate the spectrum congestion problem and make more spectrum available for use by wireless communications systems. However these systems are much more complex than the existing deployed radar systems. Furthermore, replacements of existing radar systems may be cost prohibitive and consequently such proposed systems are not currently feasible.

Therefore, more robust methods allowing for separation of simultaneously/overlappingly transmitted signals as well as simultaneous operation of wireless communications and radar devices/systems are desirable.

SUMMARY

Some example embodiments relate to methods, apparatuses and systems for enabling simultaneous operation of different technology based devices over a shared spectrum.

In one example embodiment, a device includes a memory configured to store computer-readable instructions therein and a processor. The processor is configured to execute the computer-readable instructions to receive a mixture signal, and determine a first signal and a second signal from the mixture signal, the first signal being a signal of a first technology and the second signal being a signal of a second technology, the first and second signals being overlappingly transmitted signals, at least one of the first signal and the second signal being used for processing of information associated with the at least one of the first signal and the second signal.

In yet another example embodiment, the overlapping transmission of the first signal and the second signal includes transmission of the first signal and the second signal over a shared spectrum.

In yet another example embodiment, the overlapping transmission of the first signal and the second signal includes a spatial overlap of the first signal and the second signal as well as overlaps of the first signal and the second signal in time and frequency domains.

In yet another example embodiment, the first technology is a radar technology and the second technology is a wireless communications standard.

In yet another example embodiment, the first technology and the second technology are radar technologies.

In yet another example embodiment, the first technology and the second technology are different wireless communications standards.

In yet another example embodiment, the mixture signal is a convolutive mixture of a first convolutive process, a second convolutive process and a noise signal, the first convolutive process corresponds to a convolution of the first signal and a first impulse response of a first system operating based on the first technology, and the second convolutive process corresponds to a convolution of the second signal and a second impulse response of a second system operating based on the second technology.

In yet another example embodiment, the processor is configured to minimize a cost function associated with the received mixture signal, the cost function being a function of the first signal and the second signal, and determine the first signal and the second signal from among possible sets of values of the first signal and the second signal that minimize the cost function.

In yet another example embodiment, the processor is further configured to minimize the cost the function based on an iterative process.

In yet another example embodiment, the cost function is based on the received mixture signal, the first impulse response, the second impulse response, a first regularization term corresponding to the first signal and a second regularization term corresponding to the second signal.

In yet another example embodiment, the noise signal is colored noise with an associated power spectral density.

In yet another example embodiment, the processor is configured to adjust the cost function based on the power spectral density of the colored noise.

In yet another example embodiment, the mixture signal is a combination of a convolutive process, a signal represented by combination of the second signal and a transform, and a noise signal, the convolutive process corresponds to a convolution of the first signal and an impulse response of a system operating based on the first technology, the transform is at least one of an undercomplete, complete and overcomplete transform.

In yet another example embodiment, the process is configured to minimize a cost function associated with the received mixture signal, the cost function being a function of the first signal and the second signal, and determine the first signal and the second signal from among possible sets of values of the first signal and the second signal that minimize the cost function.

In yet another example embodiment, the processor is further configured to minimize the cost function based on an iterative process.

In yet another example embodiment, the cost function is based on the received mixture signal, the impulse response, the transform, a first regularization term corresponding to the first signal and a second regularization term corresponding to the second signal.

In yet another example embodiment, a radar system includes a device configured to function as a receiver of radar signals for the radar system. The device includes a memory configured to store computer-readable instructions therein and a processor. The processor is configured to execute the computer-readable instructions to receive a mixture signal, and determine a first signal and a second signal from the mixture signal, the first signal being a signal of a first technology and the second signal being a signal of a second technology, the first and second signals being overlappingly transmitted signals, at least one of the first signal and the second signal being used for processing of information associated with the at least one of the first signal and the second signal.

In yet another example embodiment, a wireless communications system includes a device configured to function as a receiver of signals for the wireless communications system. The device includes a memory configured to store computer-readable instructions therein and a processor. The processor is configured to execute the computer-readable instructions to receive a mixture signal, and determine a first signal and a second signal from the mixture signal, the first signal being a signal of a first technology and the second signal being a signal of a second technology, the first and second signals being overlappingly transmitted signals, at least one of the first signal and the second signal being used for processing of information associated with the at least one of the first signal and the second signal.

In yet another example embodiment, when the processor processes the first signal, the processor is configured to at least one of detect objects and process a parameter, and when the processor processes the second signal, the processor is configured to establish wireless data communications between the receiver, a transmitter and other network elements in a wireless data communications system operating based on the second technology.

In one example embodiment, a device includes a memory configured to store computer-readable instructions therein and a processor. The processor is configured to execute the computer-readable instructions to receive a mixture signal, the mixture signal being a mixture of at least two signals that are overlappingly transmitted. The processor is further configured to determine each of the at least two signals based on a cost function associated with the mixture signal, and process at least one of the at least two signals transmitted by a corresponding transmitter to be received by the device.

In yet another example embodiment, the processor is configured to determine each of the at least two signals as a set of solutions that minimize a cost function among all possible sets of values of each of the at least two signals.

In yet another example embodiment, the at least two signals are transmitted by a single transmitter.

In yet another example embodiment, one of the at least two signals is transmitted by the single transmitter based on a first technology, and another one of the at least two signals is transmitted by the signal transmitter based on a second technology.

In yet another example embodiment, the overlapping transmission of the at least two signals includes transmission of the at least two signals over a shared spectrum.

In yet another example embodiment, the overlapping transmission of the at least two signals includes a spatial overlap of the at least two signals as well as overlaps of the at least two signals in time and frequency domains.

In yet another example embodiment, each of the at least two signals are transmitted based on one of at least two different technologies.

In yet another example embodiment, each of the at least two different technologies correspond to at least one of a radar technology and a wireless communications standard.

In yet another example embodiment, the processor processes the at least two signals according to a functionality of a system to which the device belongs, the system being at least one of a radar based data collection, detection, imaging and tracking system, a wireless radio communications system, a medical imaging system, and an acoustic signal processing system.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 7 describes a method of determining data sources from a mixture signal, according to an example embodiment; and FIG. 8 describes a method of determining data sources from a mixture signal, according to an example embodiment.

DETAILED DESCRIPTION OF EXAMPLE EMBODIMENTS

Figure 1:
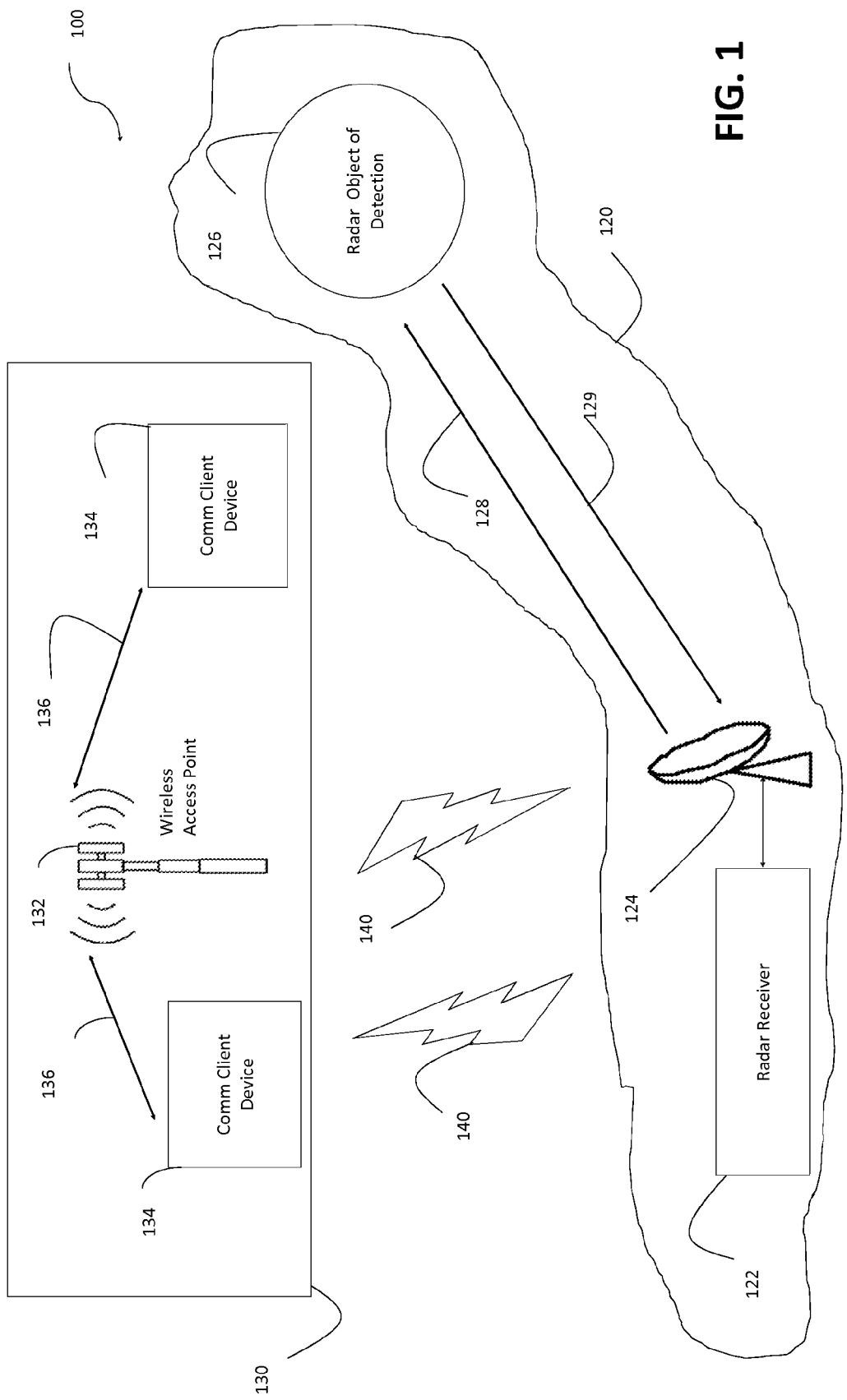
FIG. 1 illustrates a setting in which a wireless communications system and a radar system operate simultaneously, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include, but is not limited to, one or more of Central Processing Units (CPUs), Digital Signal Processors (DSPs), Graphical Processing Units (GPUs), Very Large Scale Integration (VLSI) circuits, Application-Specific-Integrated-Circuits (ASICs), Field Programmable Gate Arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

Example embodiments described herein enable simultaneous operation of devices/systems of different technologies over a shared frequency spectrum while detrimental interference of signals of one of the different technologies on signals of another one of the different technologies is minimized.

Example embodiments described herein provide a signal processing approach, in which a first device of a first technology determines/estimates a signal transmitted according to the first technology and destined for the first device, from a mixed signal received at the first device. The mixed signal includes, among various types of interference signals, a signal simultaneously transmitted according to a second technology over the same frequency spectrum (the first and second signals overlap in time and frequency domains). The first device may then utilize the determined/estimated first signal for further processing of information associated with the first signal.

Example embodiments may be utilized in conjunction with various known or to be developed Wireless Local Area Network Technologies (WLANs). Furthermore, example embodiments may also be utilized in conjunction with Radio Access Networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, a High Rate Packet Data (HRPD) system, Worldwide Interoperability for Microwave Access (WiMAX); 4G Long Term Evolution (LTE); Wi-Fi; Ultra Mobile Broadband (UMB); and $3^{rd}$ Generation Partnership Project LTE (3GPP LTE).

Example embodiments described herein enable simultaneous operation of devices/systems where the devices/systems are physically co-located and a mixture of signals transmitted by the devices/systems is composed of multiple convolutions and/or multiple signals that are effectively represented in a transform domain in order to allow reconstruction of the signals. In one example embodiment, the signals co-exist simultaneously in time and overlap in frequency.

Example embodiments described herein provide a signal processing approach, in which a first device of a first technology determines/estimates a signal transmitted according to the first technology and destined for the first device, from a mixture signal received at the first device. The mixture signal includes, among various types of interference signals, a signal simultaneously transmitted according to a second technology over the same frequency spectrum (the first and second signals overlap in time and frequency domains). The first device may then utilize the determined/estimated first signal for further processing of information associated with the first signal.

Furthermore, example embodiments described herein provide a signal processing approach, in which two or more systems operating based on the same technology (e.g., two or more radar systems) that are co-located in vicinity of one another (spatially overlap) may overlappingly transmit signals (i.e., the signals may entirely or partially overlap in time and frequency domains). Example embodiments allow for separation of the overlappingly transmitted signals by a receiver of each of the two or more systems and utilization of the separated signals for processing information associated with the separated signals according to the application/use of each of the two or more systems.

FIG. 1 illustrates a setting in which a wireless communications system and a radar system operate simultaneously, according to an example embodiment. As shown in FIG. 1, in a setting 100 two different systems co-exist (i.e., physically co-exist meaning that the two systems (and/or the signals transmitted by the two systems) are in the geographical vicinity of one another). The first system is the system 120 and the second system is the system 130. The systems 120 and 130 may operate based on different technologies. In the example embodiment shown in FIG. 1, the system 120 may be a radar system and the system 130 may be a wireless communications system. However, example embodiments are not limited to wireless communications and radar systems but may encompass any two systems operating according to different technologies. For purposes of describing example embodiments, the first system 120 and the second system 130 are considered to exist in vicinity of one another (i.e., the first system 120 and the second system 130 overlap spatially such that when the first system 120 and the second 130 transmit signals on the same or overlapping frequencies and the same or overlapping times, the signals of each induce interference on signals of the other of the two systems (each of the first system 120 and the second system 130 experience degradation in their performance due to the transmitted signal of the other of the two systems.))

The first system 120 may be a system that operates based on a different technology than the technology based on which the second system 130 operates. For example and as shown in FIG. 1, the first system 120 may be a radar system. The radar system 120 may include a radar receiver 122, a radar 124, and a radar object of detection 126. The radar receiver 122 may control the operation of the radar 124, as will be described below. The radar 124 may transmit a signal 128 to the radar object of detection 126. The echo/reflection of the signal 128 may be the signal 129 received back/detected by the radar 124 and processed by the radar receiver 122. The radar object of detection 126 may be any type of object/information to be detected, imaged, tracked, processed, and/or monitored by the radar 124.

The radar system 120 may be any coherent based radar system such as a weather radar system, surveillance radar system, airport traffic radar system, ground penetrating radar system, search and rescue radar system, car radar system including those with multiple array elements and multiple antennas (MIMO). The radar may be in a staring mode, scanning mode, circling mode, stripmap mode, etc. The radar may also be in any one of an imaging, tracking, detection or other modes.

The second system 130 may include components necessary for enabling communication according to the corresponding technology. For example, in FIG. 1 and assuming that the second system 130 operates according to a wireless communications technology (e.g., GSM based wireless communications system, CDMA based communications system, etc.), the second system 130 may include a wireless access point 132 communicating with communication client devices 134 (which may be hereinafter referred to as user equipment (UE)) via exchange of signals 136. The Wireless access point 132 may differ from one wireless communications technology to another but regardless of the underlying technology, enables the UEs 134 to establish voice/data communication with other devices and/or network components in the wireless communications system 130.

In one example embodiment and as shown in FIG. 1, the wireless access point 132 may be a base station (e.g., macro cell base station, small cell base station, femto cell base station, etc.). However, the example embodiments are not limited thereto but may encompass any other type of access point through which the UEs 134 may establish voice/data communications with other UEs (in the same network or different networks) or other network components. For example, the wireless access point 132 may be a router, when the wireless communications system 120 is a wireless local area network (WLAN) operating according to known WLAN standards such as IEEE 802 standards. Furthermore, while some components of the second system 130 are illustrated in FIG. 1, any other component necessary for enabling wireless communication within the second system 130 is implicitly included (e.g., network access points, core network elements, etc.).

More generally, the first system 120 and the second system 130 may be systems of sensors and/or system of communication devices using the same spectrum resources where the waveforms may be electromagnetic, acoustic or otherwise. The wireless communications and radar platforms may be stationary or moving on the ground, in the air/space or at the sea.

The radar system 120 may operate in one or more frequency bands (e.g., 5 GHz band).

In one example embodiment, the signals 136 of the wireless communications system 130 and the signals 128/129 of the radar system 120 may be transmitted simultaneously over the same (or overlapping) frequency band/spectrum such that the signals 136 and 128/129 overlap in time and/or frequency domains (i.e., the signals 136 and 128/129 may be said to share a spectrum, with the shared spectrum being associated with one or more specific frequencies such as 2 GHz, 5 GHz, etc.). For example, signals 136 and 128/129 may be transmitted over the entire and/or overlapping portions of the 5 GHz frequency band. Accordingly, the signals of each of the systems 120 and 130 (e.g., signals 136, 128 and 129) may induce interference on signals of the other one of the systems 120 and 130. The interference caused by each of the signals 136 and 128/129 on the other one of the signals 136 and 128/129 is illustrated as interference signal 140 in FIG. 1.

For example, the signals 136 of the system 130 may interfere with the transmitted and received signals 128/129 of the system 120. Accordingly, the mixed signal, as received at the radar receiver 122 may be a mixed signal that is a combination of the signals 129 and 136 as well as a possible noise signal.

Similarly, the signals 128/129 of the system 120 may interfere with the signals 136 of the system 130. Accordingly, the mixed signal, as received at a receiver of any one or more of the components in the system 130 (e.g., a receiver of any one of the UEs 134 and/or the wireless access point 132) may be a mixed signal that is a combination of the signals 129 and 136 as well as a possible noise signal.

As will be described in greater detail below, example embodiments enable a receiver in each of the systems 120 and 130 to separate a corresponding one of the signals 129 and 136 from the mixture received at the receiver and perform further processing thereof in accordance with the functionality of the device in each system at which the receiver is located.

While FIG. 1 illustrates a setting in which only two systems (system 120 and system 130) operating according to different technologies are deployed, example embodiments are not limited thereto. For example, there may be a more than two systems deployed in the setting 100 each of which operates based on a different technology and/or any pair of two or more of the deployed systems may operate based on the same technology while at least one of the deployed system operates based on a different technology. Regardless of the number of systems in the setting 100, each system's transmitted signals may induce interference such as interference signal 140 on the other systems in the setting 100 and thus the signal received at a receiver in each of the co-existing systems may be a mixture of overlappingly transmitted signals of each and every one of the co-existing systems.

Figure 2:
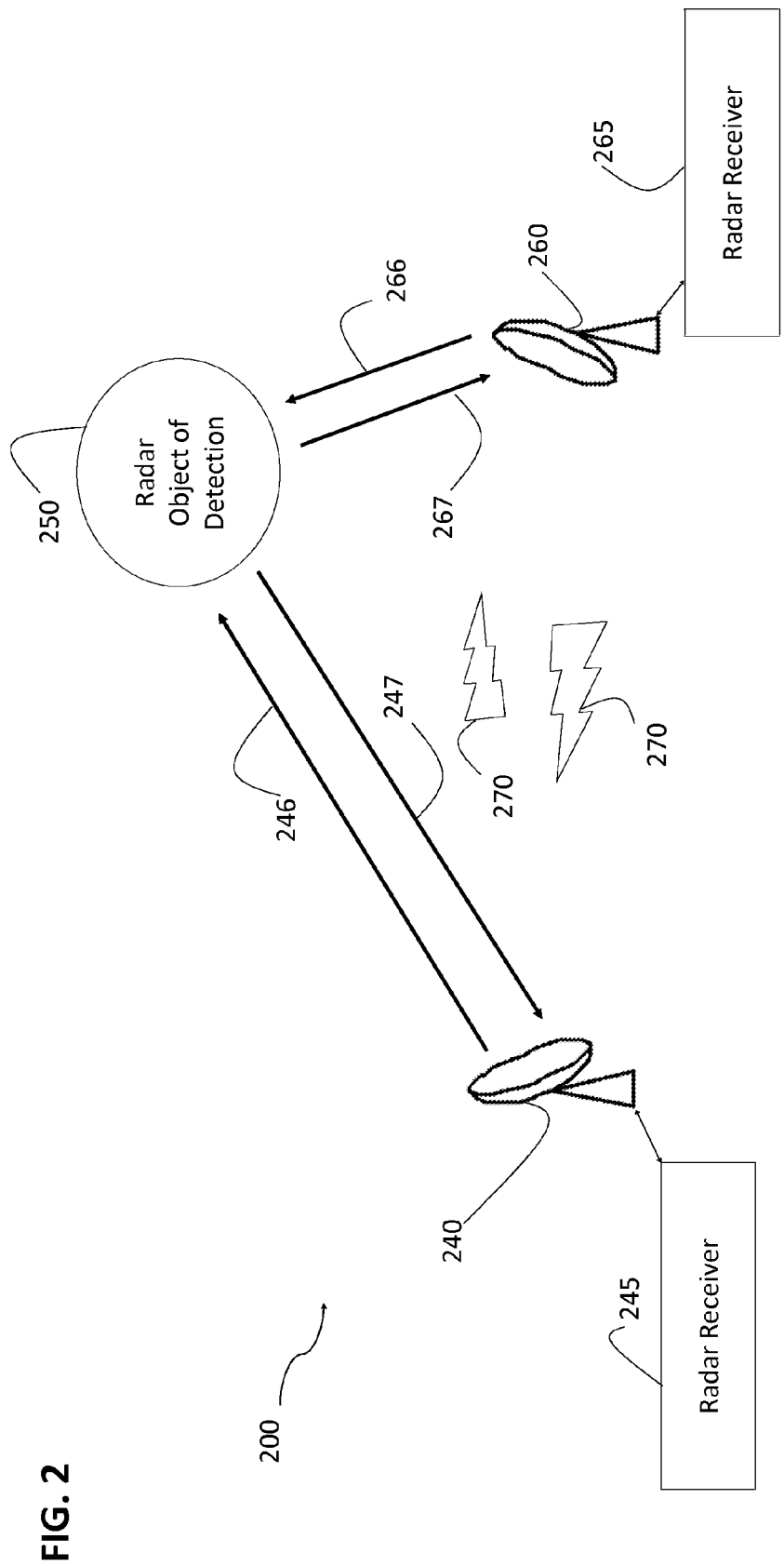
FIG. 2 illustrates a setting in which two radar systems operate simultaneously, according to an example embodiment.

FIG. 2 illustrates a setting in which two systems operating based on the same technology overlappingly transmit signals, according to an example embodiment. As shown in FIG. 2, in a setting 200 two different radar systems co-exist (i.e., physically co-exist meaning that the two radar systems (and/or signals transmitted by the two radar systems) are in the geographical vicinity of one another). The first radar system is formed by the radar 240, the radar receiver 245 and the radar object of detection 250. The first radar system may transmit radar pulses 246 toward the radar object of detection 250 and receive echoes 247 thereof. Similarly the second radar system is formed by the radar 260, the radar receiver 265 and the radar object of detection 250. The second radar system may transmit radar pulses 266 toward the radar object of detection 250 and receive echoes 267 thereof. The frequency spectrum over which signals of the first and second radar system are transmitted, may overlap. Due to the overlap between the operational spectrum of the radar devices, as well as the radar systems' geographical proximity, each radar system's received signal 246 and 266 contains interference 270 from the other one of the radar system. The interference in both radar systems may come through the antenna mainlobe, sidelobe or back-lobe.

While FIG. 2 has been described with reference to two radar systems, example embodiments are not limited thereto and inventive concepts may be applied to any two or more systems operating based on the same technology.

Figure 3:
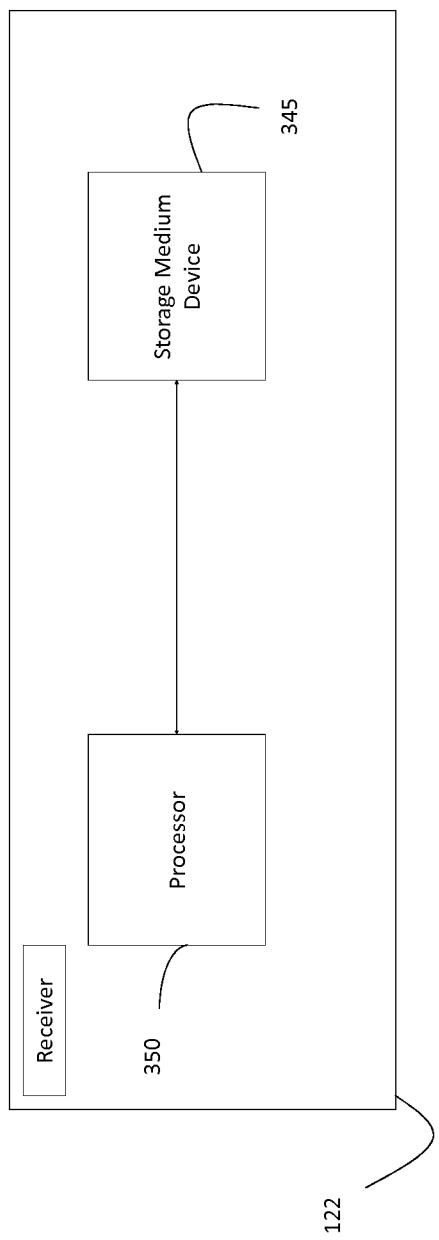
FIG. 3 illustrates a receiver for receiving signals of the first system shown in FIG. 1, according to an example embodiment.

FIG. 3 illustrates a receiver for receiving signals of the first system shown in FIG. 1, according to an example embodiment. In the example embodiment described above with reference to FIG. 1, the first system 120 is described as a radar system. However, as mentioned, the first system 120 is not limited to a radar system.

The receiver of FIG. 3 may be the radar receiver 122 of the first system 120 of FIG. 1 that is to receive a radar signal transmitted by the radar 124 to the radar object of detection 126 and reflected back to the radar 124 from the radar object of detection 126.

As shown in FIG. 3, the radar receiver 122 may include a storage medium device 345 and a processor 350. While FIG. 3 illustrates the radar receiver 122 as including three components, example embodiments are not limited thereto and the radar receiver 122 may include any number of additional components necessary for performing various functions within the radar system 120.

The storage medium device 345 may store, among other information, a set of computer-readable instructions and parameters for determining a signal of the first system 120 transmitted to the radar receiver 122 in presence of interference induced by the signal 140 described above with reference to FIG. 1, as will be described below.

The processor 350 may execute the set of computer-readable instructions for performing the functions necessary to determine a signal of the first system 120 transmitted to the radar receiver 122, as will be described below. Accordingly, the execution of the computer-readable instructions by the processor 350 may transform the processor 350 into a special purpose processor for performing the underlying functions. In addition to determining the signal of the first system 120, the processor 350 may further execute additional computer-readable instructions for processing information associated with the received signal, as will be further described below.

Figure 4:
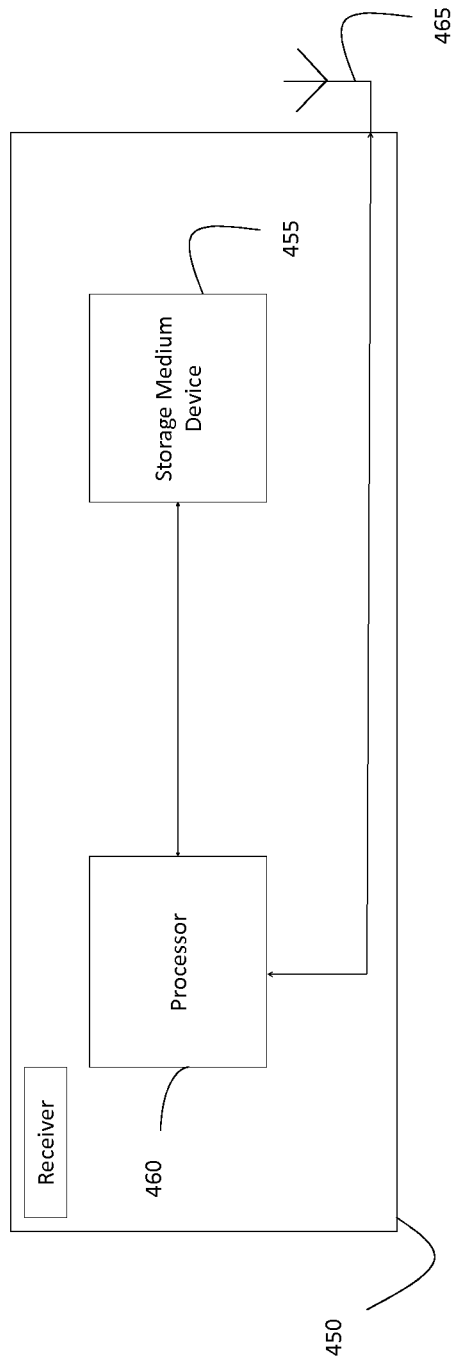
FIG. 4 illustrates a receiver for receiving signals of the second system shown in FIG. 1, according to an example embodiment.

FIG. 4 illustrates a receiver for receiving signals of the second system shown in FIG. 1, according to an example embodiment. In the example embodiment described above with reference to FIG. 1, the second system 130 is described as a wireless communications system. However, as mentioned, the second system 130 is not limited to a wireless communications system.

The receiver 450 shown in FIG. 4 may be a receiver at any one of the components in the second system 130 of FIG. 1 that is to receive a signal transmitted according to the technology based on which the second system 130 operates. For example, the receiver 450 shown in FIG. 3 may be a receiver at the UE 134, a receiver at the wireless access node 132 or a receiver at any other network component within the second system 130.

As shown in FIG. 4, the receiver 450 may include a storage medium device 455, a processor 460 and an antenna 465. While FIG. 4 illustrates the receiver 450 as including three components, example embodiments are not limited thereto and the receiver 450 may include any number of additional components necessary for performing various functions within the second system 130.

The storage medium device 455 may store, among other information, a set of computer-readable instructions and parameters for determining a signal of the second system 130 transmitted to the receiver 450, as will be described below.

The processor 460 may execute the set of computer-readable instructions for performing the functions necessary to determine a signal of the second system 130 transmitted to the receiver 450, as will be described below. Accordingly, the execution of the computer-readable instructions by the processor 460 may transform the processor 460 into a special purpose processor for performing the underlying functions. In addition to determining the signal of the second system 130 in presence of interference signal 140 described above with reference to FIG. 1, the processor 450 may further execute additional computer-readable instructions for processing information associated with the received signal, as will be further described below.

The antenna 465 may be any known or to be developed antenna installed/incorporated into the receiver 450 (which may vary depending on the component of the second system 130 in which the receiver 450 is embedded). The antenna 465 may be used to receive signals (which may be a mixture of the signal of the second system 130 as well as interference induced by an overlappingly transmitted signal of the first system 120 (in the form of interference signal 140 discussed above with reference to FIG. 1, as well as additional noise interference)). The antenna 465 may additionally be used to transmit data/information/signals to other components of the second system 130 (e.g., the antenna 465 may be a transceiver antenna).

Hereinafter, example embodiments for determining each of the signals from a mixture signal received at a receiver, will be described with reference to FIGS. 5-8. The methods described with reference to FIGS. 5-8 may be implemented at any receiver of any system such as those described above. For purposes of discussion, FIGS. 5-8 will be described with reference to the radar receiver 122 shown in FIG. 1. Furthermore, throughout FIGS. 5-8, the signals to be determined/extracted from the received mixture signal (i.e., first and second signals) may also be referred to as data sources.

Figure 5:
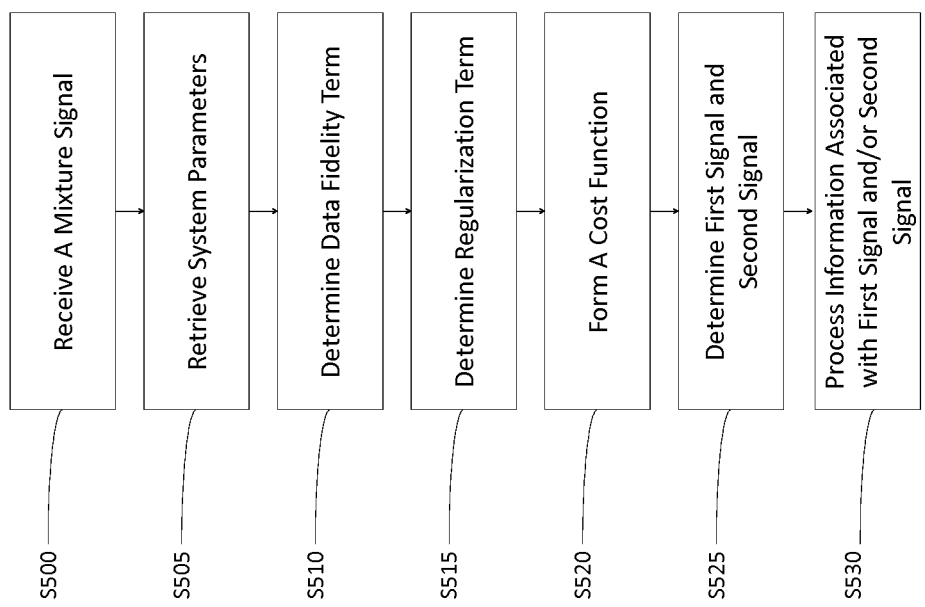
FIG. 5 describes a method of determining data sources from a mixture signal, according to an example embodiment.

FIG. 5 describes a method of determining data sources from a mixture signal, according to an example embodiment.

At S500, the radar receiver 122 (via the processor 350 associated therewith) receives a mixture signal. The mixture signal may be convolutive mixture that is a combination of two convolutive processes (e.g., $(h_1 * x_1)(n)$ and $(h_2 * x_2)(n)$, each being a different convolutive process in Equation (1)). The mixture signal may also include random noise. The convolutive mixture signal y is as shown below:

$$y(n) = (h_1 * x_1)(n) + (h_2 * x_2)(n) + w(n) \quad (1)$$

where $h_1$ and $h_2$ are filters, $x_1$ and $x_2$ are data sources, and w is a random noise term. For example, for a single carrier communications system, h is the transmit pulse and x constitutes the transmission bit train. In another system, h may be a filter that models the convolution of the transmit pulse from an antenna, the communications channel and the received front-end filters sampled at a rate to obtain a baseband signal. In another system, h may be a baseband radar pulse such as a chirp or a match-filter response, and the data source x is the reflectivity of the radar scene. For the scenario in which a radar system and a wireless communications system share a frequency spectrum or two radar systems or two wireless communications system share a frequency spectrum, the filters $h_1$ and $h_2$ are meant to overlap in frequency. Objective of example embodiments described herein is to determine signal sources $x_1$ and $x_2$.

At S505, the radar receiver 122 may also retrieve a plurality of system parameters to be utilized in determining the first and second signals (data sources), as will be described. The plurality of system parameters may be stored in the memory of the radar receiver 122 (e.g., from the storage medium device 345 described above with reference to FIG. 3) and thus may be retrieved from the memory. The plurality of system parameters may include, but is not limited to, the frequency response of a two linear time-invariant systems ($H_1$ and $H_2$).

In one example embodiment and in order to determine the data source $x_1$ and $x_2$, the radar receiver 122 determines a solution (a pair of vectors $x_1$ and $x_2$) that minimize the following cost function among all possible values of vectors $x_1$ and $x_2$.

$$J(x_1, x_2) = \theta(y; h_2, h_2, x_1, x_2) + \varphi(\lambda_1, x_1, \lambda_2, x_2) \quad (2)$$

where $\theta$ is a data-fidelity term and $\varphi$ is a regularization function, each of which may be determined as will be described below. Cost functions (which may also be referred to as optimization cost functions) may be formulated in terms of analysis or synthesis regularization terms or a mixture thereof. Example embodiments herein are meant to describe some specific cases of the formulation of optimization costs functions and the choice of analysis or synthesis terms or a combination thereof presented herein, are demonstrative and are not meant to be limiting. Alternatively, an optimization cost function may be formulated from a Bayesian estimation theory perspective and estimate the desired signal (e.g. through the maximum a posteriori (MAP) estimate). Such alternative formulations of the cost function and corresponding solutions may be derived by those skilled in the art and example embodiments of the optimization cost function formulation presented herein, are meant to be demonstrative only and thus are not meant to be limiting.

In order to formulate the cost function given in Equation (2), the ground receiver 122 determines a data fidelity term at S510. In one example embodiment, an energy cost function may be selected for the data fidelity term by the radar receiver 122. Accordingly, Equation (2) may be rewritten as shown below:

$$\{x_1, x_2\} = \underset{x_1, x_2}{\operatorname{argmin}} \left\{ \frac{1}{2} \| y - h_1 * x_1 - h_2 * x_2 \|_2^2 + \varphi(\lambda_1, x_1, \lambda_2, x_2) \right\} \quad (3)$$

Denoting Discrete Fourier Transform (DFT) as F and the inverse thereof as $F^H$ having the following property upon normalization, $$FF^H = F^H F = \quad (4)$$

and the following property of DFT, $$y(n) = (h * x)(n) \Leftrightarrow Y(k) = \sqrt{N} X(k) H(k) \quad (5)$$

using the Parseval property of the unitary DFT, Equation (3) may be rewritten as:

$$\{x_1, x_2\} = \underset{x_1, x_2}{\mathrm{argmin}} \left\{ \frac{1}{2} \| Y - \sqrt{N} X_1 H_1 - \sqrt{N} X_2 H_2 \|_2^2 + \varphi(\lambda_1, x_1, \lambda_2, x_2) \right\} \quad (6)$$

where $H_i$ (i=1 and 2) is a diagonal matrix with the elements $H_i(k)$ on the diagonal, and $X_i$ are the DFT of the signals $x_i$. The regularization parameters $\lambda_1$ and $\lambda_2$ have positive values, which may be determined as will be described below.

At S515, the radar receiver 122 determines a regularization function to be used in Equation (6). In one example embodiment, the radar receiver 122 may determine the regularization term that depends on the statistics of the under-lying source and allows for separation of sources from the convolutive mixture. Furthermore, the radar receiver 122 may determine the regularization function as a combination of regularization functions with different regularization parameter weights, and the regularization functions may be any one of $l_1$ norm, nuclear norm, other sparsity promoting functions including the $l_1$ norm, non-convex penalties, group sparse functions, total variation (in range, Doppler, CPI or scan, etc.), mixed norms, Huber loss functions, sparsity in a transform domain such as wavelets and Fourier domain, sparsity using prior knowledge such as clutter maps, structure in time-frequency transforms, etc. The regularization functions may further be determined depending on the signals being separated.

Furthermore, in one example embodiment, the $l_1$ norm may be used as the regularization function, which weights each element by the non-negative regularization parameter vector $\lambda_i$. This allows for time-varying regularization parameter as a function of the data index rather than a fixed regularization parameter for all time. In using $l_1$ norm the assumption may be that the signals may be parsimoniously represented by the filters of the convolutive mixture.

At S520, the radar receiver 122 forms the cost functions of Equation (6) based on the fidelity term determined at S510, the regularization function determined at S515.

The setting of the regularization parameter $\lambda_i$ (for i=1 and 2, for example) may depend on system parameters such as the noise variance of the system, the waveform filters used and the auto-correlation function of the colored noise. For separable norms such as the $l_1$ norm, $\lambda_i$ may be a higher dimensional vector that weights each element differently, thus allowing for the regularization parameter $\lambda_i$ to vary element-wise, and may further be useful when the noise level or out of band interference levels change. The value of the regularization parameter $\lambda_i$ may also be different for different regularization functions. One method of setting the regularization parameter is through empirical studies that may be used for different scenarios of spectrum overlap, relative power of the non-overlapping spectrum portions, the waveform filter, etc.

Another method of setting the regularization parameter $\lambda_i$ is a formula based on system parameters. Another method of setting the regularization parameter $\lambda_i$ is to test several different values of $\lambda_i$ and ascertain the optimal value of the regularization parameter $\lambda_i$, from among the test values of the regularization parameter $\lambda_i$, and the solutions of the costs function by means of statistical tests. For example, in wireless communications, the statistical test may be the cyclic redundancy check (CRC) and soft/hard error correction code metrics. In radar, the statistical test may be a function of the correlation between the transmit waveform and the estimated radar scene. Other statistical tests (e.g. generalized cross validation, the discrepancy principle, the L-curve criterion, normalized cumulative periodogram), which are known to those skilled in the art, may also be used. Henceforth, the choice of the regularization parameter $\lambda_i$ does not change the form of the optimization function and those skilled in the art may use such methods to set the regularization parameter $\lambda_i$ for different radar and wireless spectrum sharing scenarios.

Thereafter, at S525, the radar receiver 122 determines the data sources $x_1$ and $x_2$ (first and second signals, from the mixture signal received at S500). In one example embodiment, the radar receiver 122 determines the data sources $x_1$ and $x_2$ as described below using an iterative algorithm.

To minimize the cost function of Equation (6), the radar receiver 122 may apply the alternating direction method of multipliers (ADMM). An iterative algorithm to solve Equation (6) may be derived using ADMM. ADMM is equivalent to or closely related to many other algorithms, including but not limited to, dual decomposition, the method of multipliers, Douglas-Rachford splitting, Spingarn's method of partial inverses, Dykstra's alternating projections, Bregman iterative algorithms for $l_1$ problems, proximal methods, etc. Accordingly, example embodiments are not limited to applying ADMM but may instead use modified version of the ADMM in order to speed up convergence of the iterative algorithm (e.g., via modifying step-size parameters $\rho_1$ and $\rho_2$ parameters, which will be described below). Furthermore, other numerical and sparsity optimization methods for minimizing Equation (6), may be used as apparent for those skilled in the art.

Applying the ADMM, the radar receiver 122 may obtain the following iterative algorithm, in which auxiliary variables $d_1$ and $d_2$ are defined and initialized to 0 and Equations (7)-(10) are repeated in an iterative process until a convergence criterion is met.

$$\{x_1, x_2\} = \underset{x_1, x_2}{\mathrm{argmin}} \Big\{ \frac{1}{2} \| Y - \sqrt{N} X_1 H_1 - \sqrt{N} X_2 H_2 \|_2^2 + \quad (7)$$

$$\frac{\rho_1}{2} \| x_1 - u_1 - d_1 \|_2^2 + \frac{\rho_2}{2} \| x_2 - u_2 - d_2 \|_2^2 \Big\}$$

$$\{u_1, u_2\} = \quad (8)$$

$$\underset{u_1, u_2}{\mathrm{argmin}} \Big\{ \varphi(\lambda_1, x_1, \lambda_2 x_2) + \frac{\rho_2}{2} \| x_1 - u_1 - d_1 \|_2^2 + \frac{\rho_2}{2} \| x_2 - u_2 - d_2 \|_2^2 \Big\}$$

$$d_1 = d_1 - (x_1 - u_1) \quad (9)$$

$$d_2 = d_2 - (x_2 - u_2) \quad (10)$$

The convergence criterion may be a configurable variable determined based on empirical studies. In one example embodiment, satisfying the convergence criteria may be achieved by monitoring the change in the variables of the iterative loop using an appropriate norm. Alternatively, a fixed number of iterations may be used as the convergence criteria. However, the convergence criteria is not limited to the examples provided above and may include any other convergence criteria.

In Equations (7) and (8), $\rho_1$ and $\rho_2$ are step-size (which may also be referred to as multiplier) parameters. The ADMM algorithm will converge for any step-size parameter $\rho_i$. (for i=1, 2, for example). However the convergence rate may differ for different values of the step-size parameter $\rho_i$. The step-size parameter $\rho_i$ may be chosen based on empirical studies or as a function of systems parameters (e.g. noise variance). Alternatively, the step-size parameter $\rho_i$ may be chosen adaptively in each iteration of the ADMM algorithm based on functions of the difference between variables in different iterations of the ADMM loop.

In one example embodiment and in order to solve Equation (7), the radar receiver 122 utilizes the Parseval's property of the DFT. Accordingly, Equation (7) may be written as:

$$\{x_1, x_2\} = \underset{x_1, x_2}{\operatorname{argmin}} \left\{ \frac{1}{2} \left\| Y - \sqrt{N} \, X_1 H_1 - \sqrt{N} \, X_2 H_2 \right\|_2^2 + \right. \quad (11)$$

$$\frac{\rho_1}{2} \|x_1 - u_1 - d_1\|_2^2 + \frac{\rho_2}{2} \|x_2 - u_2 - d_2\|_2^2 \right\}$$

$$= \underset{x_1, x_2}{\operatorname{argmin}} \left\{ \frac{1}{2} \left\| Y - \sqrt{N} \, X_1 H_1 - \sqrt{N} \, X_2 H_2 \right\|_2^2 + \right.$$

$$\frac{\rho_1}{2} \|X_1 - U_1 - D_1\|_2^2 + \frac{\rho_2}{2} \|X_2 - U_2 - D_2\|_2^2 \right\}$$

where $X_i$, $U_i$, $D_i$ are the DFTs of $x_i$, $u_i$ and $d_i$. Equation (11) is a least-squares problem that is pairwise separable, which is reducible to a set of independent minimization problems each having two variables as shown in Equation (12):

$$\frac{1}{2} \left\| Y - \sqrt{N} \, X_1 H_1 - \sqrt{N} \, X_2 H_2 \right\|_2^2 + \quad (12)$$

$$\frac{\rho_1}{2} \|X_1 - U_1 - D_1\|_2^2 + \frac{\rho_2}{2} \|X_2 - U_2 - D_2\|_2^2 =$$

$$\frac{1}{2} \sum_k \left( |Y(k) - \sqrt{N} \, X_1(k) H_1(k) - \sqrt{N} \, X_2(k) H_2(k)|_2^2 + \right.$$

$$\rho_1 \|X_1(k) - U_1(k) - D_1(k)\|_2^2 + \rho_2 \|X_2(k) - U_2(k) - D_2(k)\|_2^2 \right)$$

In one example embodiment, the pair $\{X_1(k) \; X_2(k)\}$ may be found for each k by solving a 2×2 system of linear equations. Accordingly, the problem of minimizing the function below whose domain is two complex variables and whose range is a real value, may be considered:

$$f(x_1, x_2) = |Y(k) - \vec{h}\vec{x}|^2 + (\vec{x} - \vec{b})^H M (\vec{x} - \vec{b})^H \quad (13)$$

where $$\vec{x} = \begin{bmatrix} X_1(k) \\ X_2(k) \end{bmatrix}, \vec{h} = \left[ \sqrt{N} \, H_1(k) \; \sqrt{N} \, H_2(k) \right], \quad (14)$$

$$\vec{b} = \begin{bmatrix} U_1(k) + D_1(k) \\ U_2(k) + D_2(k) \end{bmatrix}, M = \begin{bmatrix} \rho_1 & 0 \\ 0 & \rho_2 \end{bmatrix}$$

Setting the gradient of f to zero, an expression for the minimizer $\vec{x}$ may be obtained as:

$$\vec{x} = (\vec{h}^H \vec{h} + M)^{-1} (Y(k) \vec{h}^H + M \vec{b}) \quad (15)$$

Using the Matrix Inverse lemma and simplifying Equation (15), the following solution for the minimization of Equation (11) may be obtained:

$$\begin{bmatrix} X_1(k) \\ X_2(k) \end{bmatrix} = \begin{bmatrix} R_1(k) \\ R_2(k) \end{bmatrix} - \begin{bmatrix} H_1(k) * (\rho_1^{-1}) \\ H_2(k) * (\rho_2^{-1}) \end{bmatrix} G(k)(H_1(k) R_1(k) + H_2(k) R_2(k)) \quad (16)$$

where * denotes complex conjugate, $$R_i(k) = \frac{\sqrt{N}}{\rho_i} H_i(k)^* Y(K) + U_i(k) + D_i(k) \quad (17)$$

and $$G(k) = \left( \frac{1}{N} + \frac{|H_1(k)|^2}{\rho_1} + \frac{|H_2(k)|^2}{\rho_2} \right)^{-1} \quad (18)$$

Furthermore, variable T(k) may be defined as:
$$T(k) = G(k)(H_1(k) R_1(k) + H_2(k) R_2(k)) \quad (19)$$

Using Equations (17)-(19):

$$X_i(k) = R_i(k) - \frac{1}{\rho_i} H_i(k)^* T(k) \text{ for } i = 1, 2 \quad (20)$$

Furthermore, given a separable regularization function determined at S515, Equation (8) may be written as:

$$\{u_1, u_2\} = \underset{u_1, u_2}{\operatorname{argmin}} \{\varphi_1(\lambda_1 \odot u_1) + \varphi_2(\lambda_2 \odot u_2) + \quad (21)$$

$$\frac{\rho_i}{2} \|x_1 - u_1 - d_1\|_2^2 + \frac{\rho_2}{2} \|x_2 - u_2 - d_2\|_2^2 \}$$

The decoupled Equation (21) may be written as:

$$\{u_i\} = \underset{u_i}{\operatorname{argmin}} \{\varphi_i(\lambda_i \odot u_i) + \frac{\rho_i}{2} \|x_i - u_i - d_i\|_2^2 \} \quad (22)$$

for i=1, 2.

Using the concept of the proximity operator, Equation (22) may be re-written in the notation as:

$$prox_{\varphi, \lambda, \rho}(z) = \underset{u}{\operatorname{argmin}} \{\varphi(\lambda \odot u) + \frac{\rho}{2} \|z - u\|_2^2 \} \quad (23)$$

Closed-form expressions of the proximity operators of various functions exist and if closed-form expressions are not derivable, numerical optimization methods to obtain an estimate of the proximity operator may be utilized.

Using $l_1$ norm as the regularization function, Equation (22) may be written as:

$$\{u_i\} = \underset{u_i}{\operatorname{argmin}} \{\|\lambda_i \odot u_i\|_1 + \frac{\rho_i}{2} \|x_i - u_i - d_i\|_2^2 \} \quad (24)$$

where $\odot$ denotes point-wise multiplication, the solution of which is given explicitly in terms of the soft-threshold rule:
$$u_i = \text{soft}(x_i - d_i, \lambda_i / \rho_i) \quad (25)$$

The soft-threshold rule may be applied element-wise to vectors, matrices and higher dimensional vectors. Defining "./" as point-wise division, ".^" as point-wise power for a vector and defining $v_i$ as $v_i = u_i + d_i$, the radar receiver 122, using the Equations described above, may determine the data source $x_1$ and $x_2$ by applying the following iterative process, which may also be denoted to as "dual-deconvolution with denoising" process.

The iterative algorithm defines several auxiliary variables. First a variable G is defined as shown in Equation (26), $$G = 1. \bigg/ \left( \frac{1}{N} + \frac{|H_1|^{.\wedge 2}}{\rho_1} + \frac{|H_2|^{.\wedge 2}}{\rho_2} \right) \quad (26)$$

and variables $x_i^{(0)} = x_i^{init}$, $d_i^{(0)} = d_i^{init}$ are initialized for i=1, 2. The radar receiver 122, may further define a variable k indicative of the number of iterations of the iterative process (i.e., k is a counter) and initialize k to 0. Thereafter and until a convergence criterion, as described above, is satisfied, the radar receiver 122 iteratively solves Equations (27)-(32), as shown below, with k being incremented by 1 after each iteration.

$$k = k+1 \quad (27)$$

$$v_i^{(k)} = \text{soft}\left(x_i^{(k-1)} - d_i^{(k-1)}, \frac{\lambda_i}{\rho_i}\right) + d_i^{(k-1)} \text{ for } i = 1, 2 \quad (28)$$

$$R_i^{(k)} = Fv_i^{(k)} + (\sqrt{N}/\rho_i)H_i^* \odot Y \text{ for } i=1,2 \quad (29)$$

$$T^{(k)} = G \odot (H_1 \odot R_1^{(k)} + H_2 \odot R_2^{(k)}) \quad (30)$$

$$x_i^{(k)} = F^H[R_i^{(k)} - (1/\rho_i)H_i^* \odot T^{(k)}] \text{ for } i=1,2 \quad (31)$$

$$d_i^{(k)} = v_i^{(k)} - x_i^{(k)} \text{ for } i=1,2 \quad (32)$$

$x_i^{(k)}$ for i=1 and 2 at step k where the convergence criterion is met, represent values of data sources $x_1$ and $x_2$ that minimize the cost function given in Equation (6).

The "dual-deconvolution with denoising" process described above with reference to Equations (26)-(32) may easily be extended to an M-deconvolution of M datasources from a convolutive mixture. More generally, if the convolute mixture involves M sources, Equations (26) and Equations (30) may be modified as follows:

$$G = 1. \bigg/ \left( \frac{1}{N} + \sum_{i=1}^{M} \frac{|H_i|^{.\wedge 2}}{\rho_i} \right) \quad (33)$$

$$T^{(k)} = G \odot \left( \sum_{i=1}^{M} H_i \odot R_i^{(k)} \right) \quad (34)$$

With i=1, . . . , M for all indexed variables in Equations (26)-(32).

Accordingly and upon determining data sources $x_1$ and $x_2$, as described above, at S530, the radar receiver 122 may process information associated with one or more of the data sources $x_1$ and $x_2$, determined/estimated at S525. For example, the radar receiver 122 may analyze the determined radar signal to detect objects corresponding to the underlying purpose of the radar system, track/monitor variables and/or objects of interest (e.g., speed of cars, airplanes, ships, etc.). However, the processing of the radar signal is not limited to the examples described above but may encompass any appropriate type of analysis of the determined/estimated radar signal in order to extract/study/monitor information included in or associated with the determined/estimated radar signal. Furthermore, when the receiver is a receiver of a non-radar system (e.g., a wireless communications system), the receiver, upon determining the data sources, may process any information associated with the determined data sources (e.g., transmission of voice data, communication between network components in a wireless communications system, etc.).

In one example embodiment, the mixture signal received at the receiver radar 122 may be in the form of modulated waveforms, as shown below:

$$y(n) = (h_1 * x_1)(n)e^{j\omega_1 n} + (h_2 * x_2)(n)e^{j\omega_2 n} + w(n), \text{ for } n=0, N-1 \quad (35)$$

where $\omega_1$ and $\omega_2$ are modulating waveforms. In the discrete-time Fourier transform (DTFT) domain, Equation (35) may be written as:

$$Y(\omega) = (\omega - \omega_1)X_1(\omega - \omega_1) + H_2(\omega - \omega_2)X_2(\omega - \omega_2)W(\omega) \quad (36)$$

Consequently, the cost function of Equation (3) may be reformulated as:

$$C(x_1, x_2) = \underset{\overline{x_1},\overline{x_2}}{\text{argmin}}\left\{\frac{1}{2}\|y - \overline{h_1} * \overline{x_1} + \overline{h_2} * \overline{x_2}\|_2^2 + \varphi(\lambda_1, \overline{x}_1, \lambda_2, \overline{x}_2)\right\} \quad (37)$$

where $\overline{h}_i$ and $\overline{x}_i$ are the modulated forms of $\overline{h}_i$ and $\overline{x}_i$, given by:

$$\overline{h}_i(n) = h_i(n)e^{j\omega_i n}, \overline{x}_i(n) = x_i(n)e^{j\omega_i n} \quad (38)$$

Based on these definitions, Equation (6) may be rewritten as:

$$\{\overline{x_1}, \overline{x_2}\} = \quad (39)$$

$$\underset{\overline{x_1},\overline{x_2}}{\text{argmin}}\left\{\frac{1}{2}\|Y - \sqrt{N}\,\overline{X}_1\overline{H}_1 - \sqrt{N}\,\overline{X}_2\overline{H}_2\|_2^2 + \varphi(\lambda_1, \overline{x}_1, \lambda_2, \overline{x}_2)\right\}$$

where $\overline{X}_i$ and $\overline{H}_i$ are the DFT of $\overline{x}_i$ and $\overline{h}_i$, respectively. Since Equation (39) is essentially the same as the cost function of Equation (6), the "dual-deconvolution with denoising" process may similarly be applied to find the data sources $\overline{x}_1$, $\overline{x}_2$ as solutions to Equation (39). $\overline{x}_1$ and $\overline{x}_z$ may then be demodulated using known methods in order to obtain the data-source signals.

In one example embodiment, the noise w(n) in Equation (1) is considered to be colored noise with a power spectral density (PSD) $P_w$. In order to account for w(n), the radar receiver 122 may weigh the frequencies of the data fidelity term by a function of $P_w$. In one example embodiment, the radar receiver 122 may weigh the frequencies of the data fidelity term by the reciprocal of the square root of $P_w$ while other methods of weighting the frequencies of the data fidelity term based on the power spectral density of the total noise (consisting of system noise and noise induced by co-existing/co-located systems) may also be used.

Using the reciprocal of $P_w$, Equation (6) may then be modified as follows:

$$\{x_1, x_2\} = \underset{x_1, x_2}{\text{argmin}} \quad (40)$$

$$\left\{\frac{1}{2}\left\|\frac{1}{\sqrt{P_w}}(Y - \sqrt{N}\,X_1H_1 - \sqrt{N}\,X_2H_2)\right\|_2^2 + \varphi(\lambda_1, x_1, \lambda_2, x_2)\right\}$$

Here, the term $\sqrt{P_w}$ may be absorbed in Y, $H_1$ and $H_2$, and the same "dual-deconvolution with denoising" process, as described above, may be applied to determine the data sources $x_1$ and $x_2$.

Figure 6:
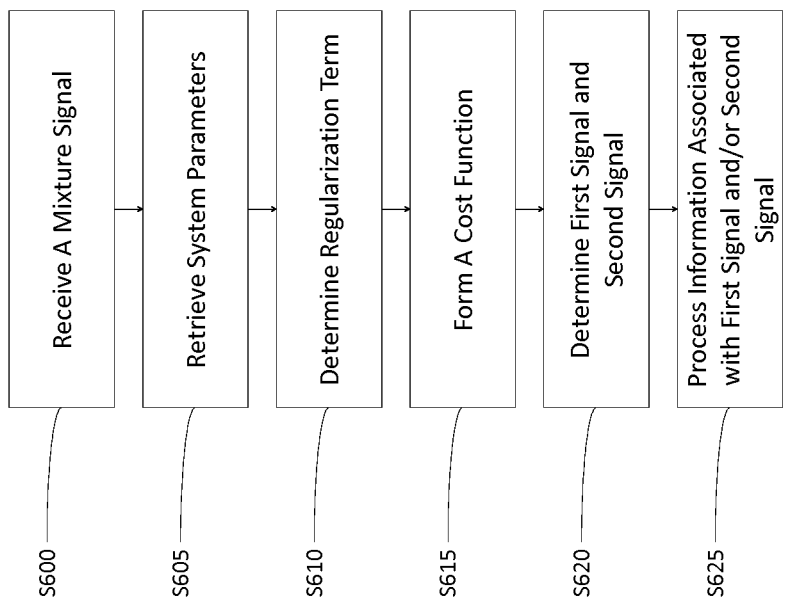
FIG. 6 describes a method of determining data sources from a mixture signal, according to an example embodiment.

FIG. 6 describes a method of determining data sources from a mixture signal, according to an example embodiment.

In FIGS. 6, S600 and S605 is the same as S500 and S505. Therefore, for the sake of brevity, S600 and S605 will not be further described.

In the cost function described herein with reference to FIG. 6, a perfect reconstruction constraint instead of the data fidelity term at S510 of FIG. 5 may be used. The perfect reconstruction constraint may be suitable for separation of signals from one another in a received mixture signal when there is no noise or small amounts of noise present (i.e., w(n) in Equation (1) is small and negligible). Because the noise term w(n) is negligible, the method of FIG. 6 does not include a step similar to S510 for determining a data fidelity term.

Accordingly, at S610, the radar receiver 122 may determine a regularization term. In one example embodiment, the regularization term may be determined as the $l_1$ norm where $\varphi(\lambda_1, x_1, \lambda_2, x_2) = \|\lambda_1 \odot x_1\|_1 + \|\lambda_2 \odot x_2\|_1$.

Thereafter, at S615, the radar receiver 122 forms the cost function based on the regularization term determined at S610. In one example embodiment, the radar receiver may form the cost function as shown in Equation (41) below.

$$\{\overline{x_1}, \overline{x_2}\} = \underset{\overline{x_1}, \overline{x_2}}{\operatorname{argmin}} \{\varphi(\lambda_1, x_1, \lambda_2, x_2)\} \text{ s.t. } y = \quad (41)$$

$$h_1 * x_1 + h_2 * x_2 \lambda_1 + \lambda_2 = 1 \text{ and } \lambda_1 \geq 0$$

At S620, the radar receiver 122 determines data sources $x_1$ and $x_2$ (first and second signals). In one example embodiment, the radar receiver 122 determines the data sources $x_1$ and $x_2$, by finding a solution that minimizes Equation (41) using an iterative process similar to the "dual-deconvolution with denoising" process described above with reference to FIG. 5. This iterative process may be denoted as the "dual-deconvolution with perfect reconstruction" process. An example of the "dual-deconvolution with perfect reconstruction" process for determining the data sources $x_1$ and $x_2$, according to the method of FIG. 6 for the $l_1$ norm regularization function is described below.

According to the "dual-deconvolution with perfect reconstruction" process, a variable G is defined as given in Equation (42). Thereafter, a plurality of variables $x_i^{(0)}$ and $d_i^{(0)}$ are initialized for i=1, 2. The radar receiver 122, may further define a variable k indicative of the number of iterations of the iterative process (i.e., k is a counter) and initialize k to 0. Thereafter, until a convergence criterion (which may be as defined above) is met, the process provided by Equations (43)-(48) is repeated with k being incremented by 1 after each iteration.

$$G = \left(\frac{|H_1|^{.\wedge 2}}{\rho_1} + \frac{|H_2|^{.\wedge 2}}{\rho_2}\right) \quad (42)$$

$$k = k+1 \quad (43)$$

$$v_i^{(k)} = \operatorname{soft}\left(x_i^{(k-1)} - d_i^{(k-1)}, \frac{\lambda_i}{\rho_i}\right) + d_i^{(k-1)} \text{ for} \quad (44)$$

$$i = 1, 2$$

$$V_i^{(k)} = F v_i^{(k)} \text{ for } i=1,2 \quad (45)$$

$$T^{(k)} = \left(\frac{Y}{\sqrt{N}} - [H_1 \odot V_1^{(k)} + H_2 \odot V_2^{(k)}]\right) / G \quad (46)$$

$$x_i^{(k)} = F^H[(1/\rho_i) H_i^* \odot T^{(k)} + V_i^{(k)}] \text{ for } i=1,2 \quad (47)$$

$$d_i^{(k)} = v_i^{(k)} - x_i^{(k)} \text{ for } i=1,2 \quad (48)$$

$x_i^{(k)}$ for i=1 and 2 at step k where the convergence criterion is met, represent values of data sources $x_1$ and $x_2$ that minimize the cost function given by Equation (41).

Thereafter, at S625, the radar receiver 122 may perform the same function as described above with reference to S530 in FIG. 5. Therefore, for the sake of brevity, S625 will be not be described any further.

FIG. 7 describes a method of determining data sources from a mixture signal, according to an example embodiment.

With respect to FIG. 7 and as will be described below, the mixture signal received at a receiver is a combination of at least one convolutive process and at least one signal that is effectively represented and/or compressible by a transform (basis, frame, dictionary), where the transform may be undercomplete, complete or overcomplete. For illustrative purposes, the special case of applying an overcomplete transform will be described.

An objective herein with reference to FIG. 7 is to obtain data-source coefficients $x_i$ and a set of transform coefficients $c_2$. For illustrative purposes, FIG. 7 will be described with reference to two signals (one being a convolutive process and one being a set of transform coefficients). However, inventive concepts may be easily extended to a case of $M=M_1+M_2$ signals where $M_1$ components are modelled as convolutive processes and $M_2$ components are modelled as arising from transforms. With respect to the transforms, the identity matrix and orthogonal transforms are encompassed by the overcomplete transform discussed.

At S700, the radar receiver 122 receives a mixture signal y that is a combination of a convolution of a data filter h with a data source $x_1$ plus a signal that is represented by an overcomplete Parseval's frame S with transform coefficients $c_2$ plus a noise term w, as shown below.

$$y(n) = (h * x_1)(n) + x_2(n) + w(n) = (h * x_1)(n) + (S c_2)_n + w(n) \quad (49)$$

where S satisfies:

$$SS^H = \alpha I, \alpha > 0 \quad (50)$$

and $S c_2 = x_2$.

The frame S may be a fast transform such as the overcomplete Inverse Fast Fourier Transform (IFFT). In general, it may be advantageous for real-time systems that S and $S^H$ be computed using fast transforms such as Fast Fourier Transform (FFT), Discrete Cosine Transform (DCT), wavelet transform, etc.

At S705, the radar receiver 122 may retrieve further inputs including a plurality of system parameters. The plurality of system parameters may be stored in the memory of the radar receiver 122 (e.g., from the storage medium device 345 described above with reference to FIG. 3) and thus may be retrieved from the memory. The plurality of system parameters may include, but is not limited to, the frequency response of a linear time-invariant system (H) corresponding to h and the transform (S).

At S710, the radar receiver 122 may form a cost function for determining/extracting the data sources from the mixture signal received at S700. In one example embodiment, the cost function to be formed in order to find the two data sources $\{x_1, x_2 = Sc_2\}$, is given by Equation (51), which is in the frequency domain:

$$\{x_1, c_2\} = \operatorname*{argmin}_{x_1, c_2} \frac{1}{2} \|Y - \sqrt{N} \operatorname{diag}(H) F x_1 - F S c_2\|_2^2 + \varphi(\lambda_1, x_1, \lambda_2, c_2) \quad (51)$$

where the data fidelity term $\frac{1}{2}\|Y-\sqrt{N}\operatorname{diag}(H)Fx_1-FSc_2\|_2^2$ and $\varphi(\lambda_1, x_1, \lambda_2, c_2)$ may de determined in a similar manner as described above with reference to FIG. 5. It is noted that with suitable zero-padding, the linear convolution given by Equation (49) is transformed to a circular convolution that is performed as a multiplication in the Fourier domain as in Equation (51).

At S715, the radar receiver 122 may determine the data sources $\{x_1, x_2 = Sc_2\}$, (first and second signals) by finding a solution to Equation (51). In one example embodiment, the radar receiver 122 may find the solution to Equation (51) (i.e., find data sources $x_1$ and $x_2$) by applying an iterative process to find the solution to equation (51). The solution to Equation (51) may be a pair of vectors ($x_1$ and $c_2$) that minimize the cost function given by Equation (51) over all possible values of $x_1$ and $c_2$.

The solution to Equation (51) may be obtained via an iterative process referred to as the "basis pursuit denoising-deconvolution (BPD-Deconv)" process. In the BPD-Deconv process, discrete Fourier Transform (DFT) is denoted as F, the inverse thereof is denoted as $F^H$ and diag is denoted as the diagonal operator.

Herein, the size of S is considered to be N×L where L≥N and N is the length of the mixture signal y. Variables A, $A_1$ and $A_2$, are defined by Equation (52)

$$A = [A_1 A_2] \text{ where } A_1 = \sqrt{N}\operatorname{diag}(H)F \text{ and } A_2 = FS \quad (52)$$

where the operators embedded in $A_1$ and $A_2$ may be performed using fast transforms. In one example embodiment, the regularization function used in Equation (51) may be a separable $l_1$ norm. The following property also holds:

$$AA^H = \sqrt{N}\operatorname{diag}(|H|^{.2}) + FSS^H F = \sqrt{N}\operatorname{diag}(|H|^{.2}) + \alpha 1 = \operatorname{diag}(N|H|^{.2} + \alpha) \quad (53)$$

Using ADMM with similar steps to the "dual-deconvolution with denoising" process described above with reference to FIG. 5, the matrix inverse lemma and the identity above given by Equation (53), the radar receiver 122 may apply the following iterative process for separating the mixture signal and determining $x_1$ and $x_2$.

The iterative process based on the BPD-Deconv process includes defining G, as given by Equation (54) and variables $y_1$ and $y_2$ as given by Equations (55) and (56).

$$G = 1. / \left(1 + \frac{N|H_1|^{.2}}{\rho_1} + \frac{\alpha}{\rho_2}\right) \quad (54)$$

$$y_1 = A_1^H F y \quad (55)$$

$$y_2 = A_2^H F y \quad (56)$$

The iterative process further includes the initializing variable d for i=1, 2 as $d_i^{(0)} = d_i^{init}$. The variables $x_1^{(0)} = x_1^{init}$ and $c_2^{(0)} = c_2^{init}$ are also initialized. The radar receiver 122, may further define a variable k indicative of the number of iterations of the iterative process (i.e., k is a counter) and initialize k to 0. Thereafter and until a convergence criterion (which may be the same as described above), the radar receiver 122 repeats Equations (57)-(65) in each step, with k being incremented by 1 after completion of each iteration of the iterative process.

$$k = k + 1 \quad (57)$$

$$u_1^{(k)} = \operatorname{soft}\left(x_1^{(k-1)} + d_1^{(k-1)}, \frac{\lambda_1}{\rho_1}\right) \quad (58)$$

$$u_2^{(k)} = \operatorname{soft}\left(c_2^{(k-1)} + d_2^{(k-1)}, \frac{\lambda_2}{\rho_2}\right) \quad (59)$$

$$b_i^{(k)} = y_i + \rho_i (u_i^{(k-1)} - d_i^{(k-1)}) \text{ for } i=1, 2 \quad (60)$$

$$Z^{(k)} = G \odot (A_1 b_1^{(k)} / \rho_1 + A_2 b_2^{(k)} / \rho_2) \quad (61)$$

$$x_1^{(k)} = b_1^{(k)} - A_1^H Z^{(k)} / \rho_1 \quad (62)$$

$$c_2^{(k)} = b_2^{(k)} - A_2^H Z^{(k)} / \rho_2 \quad (63)$$

$$d_1^{(k)} = d_1^{(k-1)} - u_1^{(k)} + x_1^{(k)} \quad (64)$$

$$d_2^{(k)} = d_2^{(k-1)} - u_2^{(k)} + c_2^{(k)} \quad (65)$$

Thereafter, $x_1^{(k)}$ and $c_2^{(k)}$ at step k where the convergence criterion is met, represent values of data sources $x_1$ and $x_2$ ($Sc_2 = x_2$) that minimize the cost function given in Equation (51).

At S720, the radar receiver 122 may perform the same functions as described above with reference to S530 in FIG. 5. Therefore, for the sake of brevity, S720 will not be further described.

FIG. 8 describes a method of determining data sources from a mixture signal, according to an example embodiment.

In FIGS. 8, S800 and S805 is the same as S700 and S705. Therefore, for the sake of brevity, S800 and S805 will not be further described.

At S810, the radar receiver 122 may form the cost function using perfect reconstruction metric. Accordingly, instead of the cost function given by Equation (51), the radar receiver 122 forms the following cost function:

$$\{x_1, x_2\} = \operatorname*{argmin}_{x_1, x_2} \{\varphi(\lambda_1, x_1, \lambda_2, c_2)\} \text{ s.t. } y = h_1 * x_1 + Sc_2 \text{ and } \lambda_i \geq 0 \quad (66)$$

where, as an example embodiment, for the $l_1$ norm regularization function, the radar receiver 122 may determine the regularization term $\varphi$ as $$\varphi(\lambda_1, x_1, \lambda_2, c_2) = \|\lambda_1 \odot x_1\|_1 + \|\lambda_2 \odot c_2\|_1,$$

as described above with reference to FIG. 6.

The application of perfect reconstruction may be suitable for separation of signals from one another in a received mixture signal when there is no noise or small amounts of noise present (i.e., w(n) in Equation (1) is small and negligible). Accordingly, Equation (66) may not contain a data fidelity term compared to the equation (51) described above with reference to FIG. 7.

At S815, the radar receiver 122 determines data sources $x_1$ and $x_2$ (first and second signals). In one example embodiment, the radar receiver 122 determines the data sources $x_1$ and $x_2$, by finding a solution that minimizes Equation (66) using an iterative process similar to the BPD-Deconv process described above with reference to FIG. 7, which may be referred to as "BPD-Deconv with perfect reconstruction" process. An example of the "BPD-Deconv with perfect reconstruction" process for determining the data sources $x_1$ and $x_2$ for the $l_1$ norm regularization function according to the method of FIG. 8 is described below.

According to the "BPD-Deconv with perfect reconstruction" process, a variable G is defined, as given by Equation (67). Furthermore, variable Y is defined in Equation (68) as the Fourier transform of y.

$$G = 1. \bigg/ \left( \frac{N|H_1|^{.\wedge 2}}{\rho_1} + \frac{\alpha}{\rho_2} \right) \quad (67)$$

$$Y = Fy \quad (68)$$

The "BPD-Deconv with perfect reconstruction" process further includes the initializing variable d for i=1, 2 as $d_i^{(0)} = d_i^{init}$. The variables $x_1^{(0)} = x_1^{init}$ and $c_2^{(0)} = c_2^{init}$ are also initialized. The radar receiver 122, may further define a variable k indicative of the number of iterations of the iterative process (i.e., k is a counter) and initialize k to 0. Thereafter and until a convergence criterion (which may be the same as described above), the radar receiver 122 repeats Equations (69)-(78) in each step, with k being incremented by 1 after completion of each iteration of the iterative process.

$$k = k+1 \quad (69)$$

$$u_1^{(k)} = \text{soft}\left(x_1^{(k-1)} + d_1^{(k-1)}, \frac{\lambda_1}{\rho_1}\right) \quad (70)$$

$$u_2^{(k)} = \text{soft}\left(c_2^{(k-1)} + d_2^{(k-1)}, \frac{\lambda_2}{\rho_2}\right) \quad (71)$$

$$b_1^{(k)} = (u_1^{(k)} - d_1^{(k-1)}) \quad (72)$$

$$b_2^{(k)} = (u_2^{(k)} - d_2^{(k-1)}) \quad (73)$$

$$T^{(k)} = G \odot (Y - A_1 b_1^{(k)} - A_2 b_2^{(k)}) \quad (74)$$

$$x_1^{(k)} = \frac{A_1^H T^{(k)}}{\rho_1} + b_1 \quad (75)$$

$$c_2^{(k)} = \frac{A_2^H T^{(k)}}{\rho_2} + b_2 \quad (76)$$

$$d_1^{(k)} = d_1^{(k-1)} - u_1^{(k)} + x_1^{(k)} \quad (77)$$

$$d_2^{(k)} = d_2^{(k-1)} - u_2^{(k)} + c_2^{(k)} \quad (78)$$

In one example embodiment, $x_1^{(k)}$ and $c_2^{(k)}$ at step k where the convergence criterion is met, represent values of data sources $x_1$ and $x_2$ ($Sc_2 = x_2$) that minimize the cost function given in Equation (66).

Thereafter, at S820, the radar receiver 122 may perform the same function as described above with reference to S530 in FIG. 5. Therefore, for the sake of brevity, S820 will be not be described any further.

While FIGS. 5-8 are described above with reference to the radar receiver 122, example embodiments are not limited thereto. For example the methods described above with reference to FIGS. 5-8, may be implemented at a receiver in any one of the system components of a wireless communications system such as the second system 130 shown in FIG. 1 (e.g., a receiver of any one of the UEs 134, the receiver of the wireless access node 132, etc.).

In some example embodiments, there may be more than one system of a particular technology. For example, in the setting shown in FIG. 1, there may be more than one radar system such as the system 120. In other words, there may be two radar systems 130 and the wireless communications system 120 whose signals may be simultaneously and overlappingly transmitted. Accordingly, a radar receiver 122 of any of the radar systems 130 may suppress the radar signals of the other one of the radar systems 130 (i.e., undesired radar signal) when implementing example embodiments for determining/estimating the corresponding radar signal (i.e., the desired radar signal). In this context, suppressing of a radar signal may be understood to include eliminating the influence of the undesired radar signal sufficiently so that the undesired radar signal induces minimal detrimental effect on determining/estimating the desired radar signal.

In one example embodiment, any of the radar systems 120 may suppress the undesired radar signals of the other radar system(s) 120 by adjusting in the cost function the power spectral densities on frequencies on which the undesired radar signals of the other radar system(s) 120 are transmitted.

In one example embodiment, there may be more than one wireless communications system and a radar system. Accordingly, a receiver at a component of any of the wireless communications systems may suppress the signals associated with the other wireless communications system(s) (i.e., the undesired wireless communications signals), when determining the radar signal and subsequently the intended wireless communications signal.

In one example embodiment, the receiver at a component of any of the wireless communications systems may suppress the undesired wireless communications signals in a similar manner as described above with reference to the radar systems (e.g., in the cost function adjusting power spectral densities on frequencies on which the undesired wireless communications signals are transmitted).

In another example embodiment and when the undesired wireless communications signals are sparse, the receiver at a component of any of the wireless communications systems may suppress the undesired wireless communications signals by subtracting the sparse undesired wireless communications signals from the intended (desired wireless communications) signal.

Example embodiments described above provide numerous advantages over existing methods in the art, as described in the Background Section. Some of the advantages are described below.

The example advantages are described with respect to one or more of example embodiments described herein. However, example advantages are not meant to limit all example embodiments described herein. One or more example embodiments may provide advantages other than the example advantages described below.

One example advantage provided by example embodiments of inventive concepts is enabling separation of sources of a convolutive mixtures using one observed time-series/channel of observation. In terms of the RF spectrum environment, inventive concepts enable frequency spectrum sharing applications using only one antenna (although example embodiments are not limited to one antenna) and multiple uncoordinated sources transmitting concurrently over the same frequency spectral band.

Another example advantage provided by example embodiments of inventive concepts, relative to DSA and DFS technology, is enabling both types of systems to operate simultaneously. That is, the signals overlapping in time while overlapping partially or fully in frequency may be recovered.

Furthermore, while example embodiments have been described with a focus on radar and wireless communications systems, inventive concepts apply to other fields and sensors such as biomedical, optics, IR, acoustics, seismic, sonar, ultrasound, speech signals where separation of components/signals are used for signal processing tasks.

Variations of the example embodiments are not to be regarded as a departure from the spirit and scope of the example embodiments, and all such variations as would be apparent to one skilled in the art are intended to be included within the scope of this disclosure.

What is claimed is:

1. A device comprising:
   a memory configured to store computer-readable instructions therein; and
   a processor configured to execute the computer-readable instructions to,
      receive a mixture signal, the mixture signal being a convolutive mixture of a first convolutive process, a second convolutive process and a noise signal, the first convolutive process corresponding to a convolution of a first signal and a first impulse response of a first system operating based on a first technology, the second convolutive process corresponding to a convolution of a second signal and a second impulse response of a second system operating based on a second technology, the first signal being a signal of Hail the first technology and the second signal being a signal of the second technology, the first and second signals being overlappingly transmitted signals,
      minimize a cost function associated with the received mixture signal, the cost function being based on the received mixture signal, the first impulse response, the second impulse response, a first regularization term corresponding to the first signal and a second regularization term corresponding to the second signal, and
      determine the first signal and the second signal from among possible sets of values of the first signal and the second signal that minimize the cost function, at least one of the first signal and the second signal being used for processing of information associated with the at least one of the first signal and the second signal.

2. The device of claim 1, wherein the overlapping transmission of the first signal and the second signal includes transmission of the first signal and the second signal over a shared spectrum.

3. The device of claim 2, wherein the overlapping transmission of the first signal and the second signal includes a spatial overlap of the first signal and the second signal as well as overlaps of the first signal and the second signal in time and frequency domains.

4. The device of claim 2, wherein the first technology is a radar technology and the second technology is a wireless communications standard.

5. The device of claim 2, wherein the first technology and the second technology are radar technologies.

6. The device of claim 2, wherein the first technology and the second technology are different wireless communications standards.

7. The device of claim 1, wherein the processor is further configured to minimize the cost the function based on an iterative process.

8. The device of claim 1, wherein the noise signal is colored noise with an associated power spectral density.

9. The device of claim 8, wherein the processor is configured to adjust the cost function based on the power spectral density of the colored noise.

10. A radar system, comprising:
    the device of claim 1 configured to function as a receiver of radar signals for the radar system.

11. A wireless communications system, comprising:
    the device of claim 1 configured to function as a receiver of signals for the wireless communications system.

12. The device of claim 1, wherein
    when the processor processes the first signal, the processor is configured to at least one of detect objects and process a parameter, and
    when the processor processes the second signal, the processor is configured to establish wireless data communications between the receiver, a transmitter and other network elements in a wireless data communications system operating based on the second technology.

13. A device comprising:
    a memory configured to store computer-readable instructions therein; and
    a processor configured to execute the computer-readable instructions to,
       receive a mixture signal, the mixture signal being a mixture of at least two signals that are overlappingly transmitted and a noise signal,
       determine each of the at least two signals based on a cost function associated with the mixture signal, the cost function being based on at least the received mixture signal, a plurality of regularization terms corresponding to the at least two signals, a first impulse response corresponding to a first one of the at least two signals and one of a transform or a second impulse response corresponding to a second one of the at least two signals, and
       process at least one of the at least two signals transmitted by a corresponding transmitter to be received by the device.

14. The device of claim 13, wherein the processor is configured to determine each of the at least two signals as a set of solutions that minimize the cost function among all possible sets of values of each of the at least two signals.

15. The device of claim 13, wherein the at least two signals are transmitted by a single transmitter.

16. The device of claim 13, wherein
    one of the at least two signals is transmitted by the single transmitter based on a first technology, and
    another one of the at least two signals is transmitted by the signal transmitter based on a second technology.

17. The device of claim 13, wherein the overlapping transmission of the at least two signals includes transmission of the at least two signals over a shared spectrum.

18. The device of claim 17, wherein the overlapping transmission of the at least two signals includes a spatial overlap of the at least two signals as well as overlaps of the at least two signals in time and frequency domains.

19. The device of claim 13, wherein each of the at least two signals are transmitted based on one of at least two different technologies.

20. The device of claim 19, wherein each of the at least two different technologies correspond to at least one of a radar technology and a wireless communications standard.

21. The device of claim 13, wherein the processor processes the at least two signals according to a functionality of a system to which the device belongs, the system being at least one of,
- a radar based data collection, detection, imaging and tracking system,
- a wireless radio communications system,
- a medical imaging system, and
- an acoustic signal processing system.

22. A device comprising:
- a memory configured to store computer-readable instructions therein; and
- a processor configured to execute the computer-readable instructions to,
  - receive a mixture signal, the mixture signal being a combination of a convolutive process, a signal represented by a combination of the second signal and a transform, and a noise signal, the convolutive process corresponding to a convolution of the first signal and an impulse response of a system operating based on a first technology, the transform being at least one of an undercomplete, complete and overcomplete transform, the first signal being a signal of the first technology and the second signal being a signal of a second technology, the first and second signals being overlappingly transmitted signals,
  - minimize a cost function associated with the received mixture signal, the cost function being based on the received mixture signal, the impulse response, the transform, a first regularization term corresponding to the first signal and a second regularization term corresponding to the second signal, and
  - determine the first signal and the second signal from among possible sets of values of the first signal and the second signal that minimize the cost function, at least one of the first signal and the second signal being used for processing of information associated with the at least one of the first signal and the second signal.

23. The device of claim 22, wherein the processor is further configured to minimize the cost function based on an iterative process.

* * * * *